United States Patent Office 3,322,211
Patented May 30, 1967

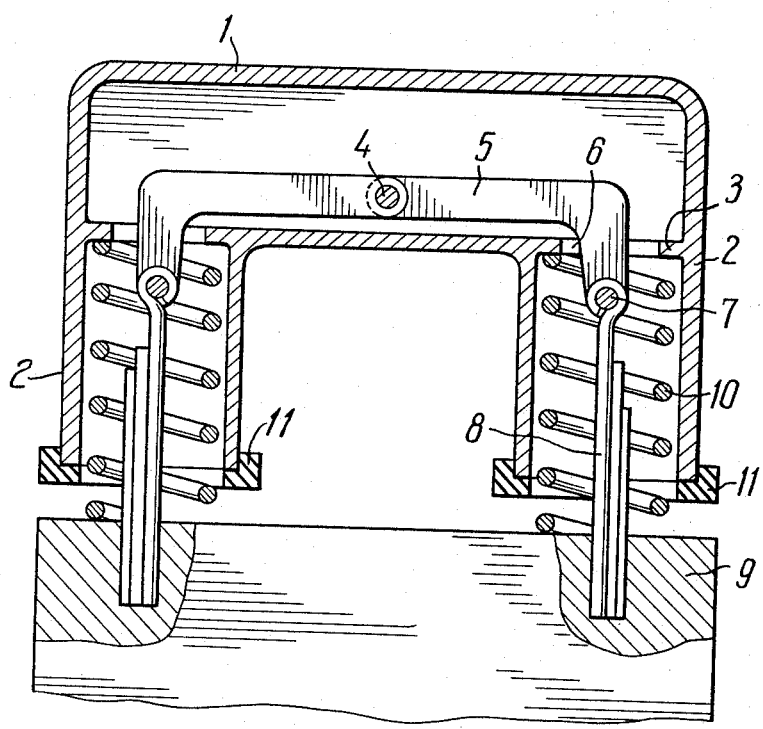

3,322,211
ELASTIC HANDLE FOR VIBRATING-IMPACT MECHANISMS
Petr Mikhailovich Alabuzhev, Anatoly Kuzmich Zuev, Gennady Konstatinovich Rezanov, and Jury Prokopjevich Tsivinsky, all of Novosibirsk, U.S.S.R., assignors to Novosibirsky elektrotekhnichesky Institute
Filed May 6, 1964, Ser. No. 365,323
6 Claims. (Cl. 173—162)

The invention relates to devices for absorbing vibrations transmitted to the hands of the operator from hand held vibrating-impact mechanisms, and more precisely to elastic handles for drills, for example handles of pneumatic drills and electric picks.

The invention can be also used in vehicle wheel suspensions where it is expedient to absorb vibrations both in the vertical and horizontal directions.

Elastic drill handles with means for absorbing vibrations transmitted to the hands of the operator are widely known. A disadvantage of the existing absorbers, such as pads made of elastic materials, for instance, rubber, or rubber cushions, is that they aborb satisfactorily only a small amplitude of vibrations. The absorption of a larger amplitude requires much larger pads or cushions which would considerably increase the weight and size of the handle and make it inconvenient for use.

There also exist means for absorbing the vibration of drill handles by employing a compressed-air cushion produced by pistons in cylinders.

Such means, however, can be used only in pneumatic mechanisms. Besides, they require various packings which complicate the design and reduce their service life. Another disadvantage of such devices is that their damping properties depend upon the change of air pressure in the supply mains.

There also exist devices in which damping is achieved by means of coil springs or blade springs arranged perpendicularly to the impact direction.

The above devices, as well as those with air cushions, absorb vibrations only in the direction of the impact force and cannot absorb vibrations acting in the direction perpendicular to the impact and occurring during operation of said mechanisms for various reasons.

An object of the present invention is to overcome the above disadvantages so as to improve the working conditions and to increase the labor productivity of the operator by providing an elastic handle with means for absorbing vibrations wherein said means is of simple design, has stable absorption properties and is capable of absorbing vibrations transmitted to the hand of the operator not only in the direction of impact, but also in the direction perpendicular thereto.

According to the present invention in addition to coil springs in the tubular shanks of the handle housing, springs are fixed in the drill head, each of which is pivotally connected with a corresponding cranked lever, the other end of which lever is pivotally mounted inside the cylindrical part of the handle housing on an axle common for both levers.

It is advisable to provide rubber rings on the open end faces of the shanks so as to prevent sharp impact when the handle approaches the drill head during the recoil following the impact.

An embodiment of the invention is illustrated in partial section in the annexed drawing.

The handle comprises a housing consisting of cylindrical part 1 and two tubular shanks 2 arranged perpendicularly to the axis of said cylindrical part and having partition 3 at the juncture with the cylindrical part 1. Shaft 4 is rigidly secured in the middle of the cylindrical part 1. On the shaft 4 are mounted two cranked levers 5 each of which passes through slot 6 of the corresponding tubular shanks 2, both levers being connected by hinges 7 with corresponding springs 8 rigidly secured to the drill head 9.

Inside the tubular shanks 2 are secured coil springs 10 which embrace the springs 8 and rest with one end on the partition 3 of the tubular shank 2 and with the other end on the drill head 9.

Elastic rings 11, made, for example, of rubber, are fixed on the open end faces of the tubular shanks 2 in order to prevent sharp impact of the handle against the pick head during the recoil.

Though the present invention is described in accordance with a preferred embodiment, changes and variations may be made without departing from the scope and spirit of the invention as defined in the attached claims.

What is claimed is:

1. An elastic handle for hand held vibrating impact mechanisms, said handle comprising a hollow housing including a central portion, a pair of projecting portions, and a partition between said central portion and said projecting portions; a pair of levers hingeably supported in said central portion and extending through slots provided in said partition into respective projecting portions; elastic members each having one end pivotally secured to a respective of said levers in said projecting portion and an opposite end adapted for being fixedly secured with a vibratable impact mechanism; and a coil spring in each projecting portion adapted for contacting the impact mechanism to be compressed between said partition and the impact mechanism.

2. A handle as claimed in claim 1 wherein said central portion is cylindrical and said projecting portions extend parallel to the axis of the central cylindrical portion.

3. A handle as claimed in claim 1 wherein said elastic members are longitudinal springs.

4. A handle as claimed in claim 1 comprising elastic rings on said projecting portions for resisting shock between the handle and the impact mechanism.

5. A handle as claim in claim 3 wherein each coil spring encircles the longitudinal spring in the same projecting portion.

6. A handle as claimed in claim 1 comprising a common shaft pivotally supporting said levers.

References Cited

UNITED STATES PATENTS

| | | | |
|---|---|---|---|
| 1,358,486 | 11/1920 | Wilhelm | 267—1 |
| 2,062,817 | 12/1936 | Noble | 173—162 |
| 2,101,869 | 12/1937 | Noble | 173—162 |
| 2,831,463 | 4/1958 | Ekstrom | 173—162 |

FOREIGN PATENTS 657,213  1/1929  France.

FRED C. MATTERN, Jr., *Primary Examiner.*
MILTON KAUFMAN, *Examiner.*
L. P. KESSLER, *Assistant Examiner.*